United States Patent [19]

Fujii

[11] Patent Number: 5,299,755
[45] Date of Patent: Apr. 5, 1994

[54] LID LOCKING MECHANISM FOR A TAPE CASSETTE

[75] Inventor: Hiroshi Fujii, Tokyo, Japan

[73] Assignee: Sony Corporation, Tokyo, Japan

[21] Appl. No.: 883,784

[22] Filed: May 15, 1992

[30] Foreign Application Priority Data

May 27, 1991 [JP] Japan .................................. 3-149236

[51] Int. Cl.⁵ ............................................ G11B 23/02
[52] U.S. Cl. ...................................... 242/199; 360/132
[58] Field of Search .................. 242/197, 199; 360/132

[56] References Cited

U.S. PATENT DOCUMENTS

| | | | |
|---|---|---|---|
| 4,885,651 | 12/1989 | Shiba et al. | 242/199 XR |
| 4,951,167 | 8/1990 | Hiramoto et al. | 242/199 XR |
| 5,084,799 | 1/1992 | Moo Yeol et al. | 242/199 XR |

*Primary Examiner*—Daniel P. Stodola
*Assistant Examiner*—Paul T. Bowen
*Attorney, Agent, or Firm*—William S. Frommer; Alvin Sinderbrand

[57] ABSTRACT

A tape cassette for use in a recording and/or reproducing apparatus, wherein tape reels for winding a recording tape are rotatably accommodated in a box-shaped cassette casing which is formed by combining upper and lower cassette halves, the recording material is extended outward along the front wall of the cassette casing between tape outlets formed at both end portions of a front wall of the cassette casing, and a lid for opening and closing the front surface of the recording tape which extends along the front wall of the cassette casing is supported at the front portion of the cassette casing so as to be rotatable upward and downward. A lid locking mechanism includes: an engagement formed on the inner surface of the lid; a lid locking member having a projection and rotatably supported at its upper end between the halves, the lid locking member being resiliently biased in a manner that its lower end turns forwardly so that the projection engages with the engagement formed on the inner surface of the lid; and a stopper formed on one of the halves, the stopper abutting against or closing to the upper surface of the projection in a locked state where the projection engages with the engagement.

2 Claims, 9 Drawing Sheets

LID LOCKING MECHANISM FOR A TAPE CASSETTE

BACKGROUND OF THE INVENTION

1. Field of the Invention

The present invention generally relates to lid locking mechanisms for a cassette and, more particularly, is directed to a lid locking mechanism for a tape cassette which locks a lid for closing and opening the front face of a magnetic tape at a closed position.

2. Description of the Prior Art

A tape cassette has been proposed, in which tape reels for winding therearound a tape-shaped recording medium are rotatably accommodated in a box-shaped cassette casing which is formed by combining two cassette halves or cassette shells, the recording medium is extended outward along the front wall of the cassette casing between tape outlets formed at both end portions of a front wall of the cassette casing, and a lid for opening and closing a front surface of the recording medium which extends along the front wall of the cassette casing is supported at a front portion of the cassette casing so as to become rotatable upward and downward. This type of tape cassette is usually provided with a lid locking mechanism for locking the lid at a closed position wherein the front face of the recording medium (magnetic tape) disposed along the front face of the cassette casing is covered or closed by the lid.

An example of the conventional lid locking mechanism will be explained with reference to FIGS. 1 to 3.

Referring to FIGS. 1 to 3, each of an upper half a and a lower half b is formed by molding synthetic resin.

A cassette compartment c is formed on one of opposite end portions of the front edge of a bottom wall d of the lower half b. The cassette compartment c has an elongated rectangular configuration along the side wall of the lower half and its front end is notched to form a slit e. Two recesses f, f are formed at both sides of the top end of the cassette compartment c. Further, top and bottom ends of the cassette compartment c are opened.

A guide groove g is formed on the bottom surface of the bottom wall d of the lower half b at portion corresponding to the bottom portion of the cassette compartment c.

A lid locking member h of an elongated hook-like configuration is provided at a top end thereof with supporting pins i, i of short cylindrical configuration which projects outwardly from the opposite sides thereof.

The lid locking member h is further provided with a groove j opened to the rear end thereof which is positioned at a portion of one of the opposite sides of the top end thereof and along a proximal end of the supporting pin i. Spring engagements k, k are projected at upper and lower opening ends of the groove j.

A portion of the lid locking member k positioned on a front face thereof slightly above the center portion thereof projects forwardly to form a projection l. Further, a portion of the lid locking member h positioned at the bottom end of the front face projects forwardly to form a pressed portion m.

Thus constituted lid locking member h is inserted within the cassette compartment c in a manner that the supporting pins i, i are positioned in the recesses f, f of the accommodating portion c.

At two portions on the lower surface of a top wall or ceiling n of the upper half b, pressing elements o, o project downwardly from the lower surface thereof parallel and opposite with each other in the horizontal direction. When the upper and lower halves a and b are coupled, the lower surfaces of the pressing elements o, o abut the top ends of the both side walls of the accommodating portion c respectively, thereby closing the upper openings of the notches f, f which receives the supporting pins i, i of the lid locking member h, so that the supporting pins i, i are prevented from being dropped out from the notches f, f.

The coil portion of a torsion spring p is wound round one of the supporting pins i so as to be positioned in the groove j. One of the arms of the torsion spring p is resiliently abutted against the lower surface of the top wall of the upper half a and the other arm is resiliently abutted against the lower surface of the groove j, so that the lid locking member h is resiliently biased such that its bottom end turns forwardly.

Thus, when the lid locking member h is not applied with a pressure from its front side, a portion of the front face thereof just above the pressed portion m abuts against the front edge of the bottom opening of the cassette compartment c, and so the lid locking member h is prevented from turning forwardly any more. A position of the lid locking member h in this state is called a locked position. In this state, the pressed portion m is positioned in the guide groove g of the cassette casing.

A front lid r is rotatably supported at the front edge of the cassette casing. As shown in FIGS. 2 and 3, a portion of the inner surface of the front wall of the front lid r positioned slightly below the projection l of the lid locking member h is projected rearwardly to form an engagement portion s.

In the closed position of the front lid r in which the front portion of the cassette casing is closed by the front lid r, the projection l of the lid locking member h is positioned just above the engagement portion s of the front lid r.

In this state, even if the force is applied to the front lid r so as to forcibly turn it towards the open position, the front lid r is prevented from being turned since the engagement portion s engages with the projection l of the lid locking member h.

When the tape cassette having the thus constituted lid locking mechanism is loaded in a recording and/or reproducing apparatus, a locking releaser provided in a cassette holder (not shown) of the recording and/or reproducing apparatus is inserted into the guide groove g to press the pressed portion m of the lid locking member h rearwardly. Then, the lid locking member h turns rearwardly against the resilient force of the torsion spring p such that the bottom end thereof moves rearwardly. Thus, since the projection l moves rearwardly from the position just above the engagement portion s of the front lid r, the front lid r becomes free to turn towards its open position.

Therefore, the locking of the front lid r by the lid locking member h is released.

However, the thus constituted lid locking mechanism for a tape cassette has the disadvantage such that when the force is applied to the front lid r so as to forcibly turn it towards the open position, an abutment between the upper and lower halves a and b opens.

When the force is applied to the front lid r so as to forcibly turn it towards the open position, the engagement portion s of the front lid r tends to move upwardly while turning. However, since the projection 1 of the lid locking member h is positioned just above the engagement portion s, the engagement portion s abuts against the projection 1 and so it can not move upwardly any more. Thus, the front lid r can not turn upwardly towards the open position.

If any more force is applied to the front lid r so as to forcibly turn it towards the open position, the force is applied to the lid locking member h so as to lift it upward, and so the force is further applied through the supporting pins i, i of the lid locking member h to the portion of the upper half a where the pressing elements o, o are formed so as to lift it above. The abutment between the upper and lower halves a and b is not fixedly combined but detachably connected with each other by screws or the like at several portions. Thus, if the above-described force is applied to the upper half a through the lid locking member h, a part of the upper half a is detached or separated from the lower half b, so that an operator may feel uneasiness. Further, when the force for forcibly turning the front lid r upwardly is large, the abutment between the upper and lower halves a and b coupled by the screws or the like may be broken due to the stress concentrically applied thereto.

OBJECTS AND SUMMARY OF THE INVENTION

Therefore, it is an object of the present invention to provide an improved lid locking mechanism for a tape cassette in which the aforementioned shortcomings and disadvantages encountered with the prior art can be eliminated.

More specifically, it is an object of the present invention to provide a lid locking mechanism for a tape cassette which can prevent such phenomena that an abutment between the lower and upper halves is opened and that the lower and upper halves are damaged.

As an aspect of the present invention, a lid locking mechanism for a tape cassette wherein tape reels for winding a tape-shaped recording medium are rotatably accommodated in a box-shaped cassette casing which is formed by combining two or upper and lower cassette halves, the recording medium is extended outward along a front wall of the cassette casing between tape outlets formed at both end portions of the front wall of the cassette casing, and a lid for opening and closing a front surface of the recording medium which extends along the front wall of the cassette casing is supported at a front portion of the cassette casing so as to be rotatable upward and downward, a lid locking mechanism is comprised of: an engagement formed on an inner surface of the lid; a lid locking member having a projection and rotatably supported at its upper end between the halves, the lid locking member being resiliently biased in a manner that its lower end turns forwardly so that the projection engages with the engagement formed on the inner surface of the lid; and a stopper formed on one of the halves, the stopper abutting against or closing to an upper surface of the projection in a locked state where the projection engages with the engagement.

According to the thus constituted lid locking mechanism for a tape cassette, since the force applied to the front lid for forcibly turning it towards the open position is transmitted to the stopper portion of the lower half through the engagement portion and the projection of the lid locking member, no force acts on the upper half to separate it from the lower half. Thus, it can be prevented that an abutment between the lower and upper halves is opened and that the lower and upper halves are damaged.

The above and other objects, features, and advantages of the present invention will become apparent from the following detailed description of an illustrative embodiment thereof when read in conjunction with the accompanying drawings, in which like reference numerals are used to identify the same or similar parts in the several views.

DETAILED DESCRIPTION OF THE PREFERRED EMBODIMENT

A lid locking mechanism for a tape cassette according to an embodiment of the present invention will now be described with reference to FIGS. 4 through 9.

FIGS. 4 through 9 show a tape cassette 1 to which the lid locking mechanism according to the embodiment of the present invention is applied.

Figure 1:
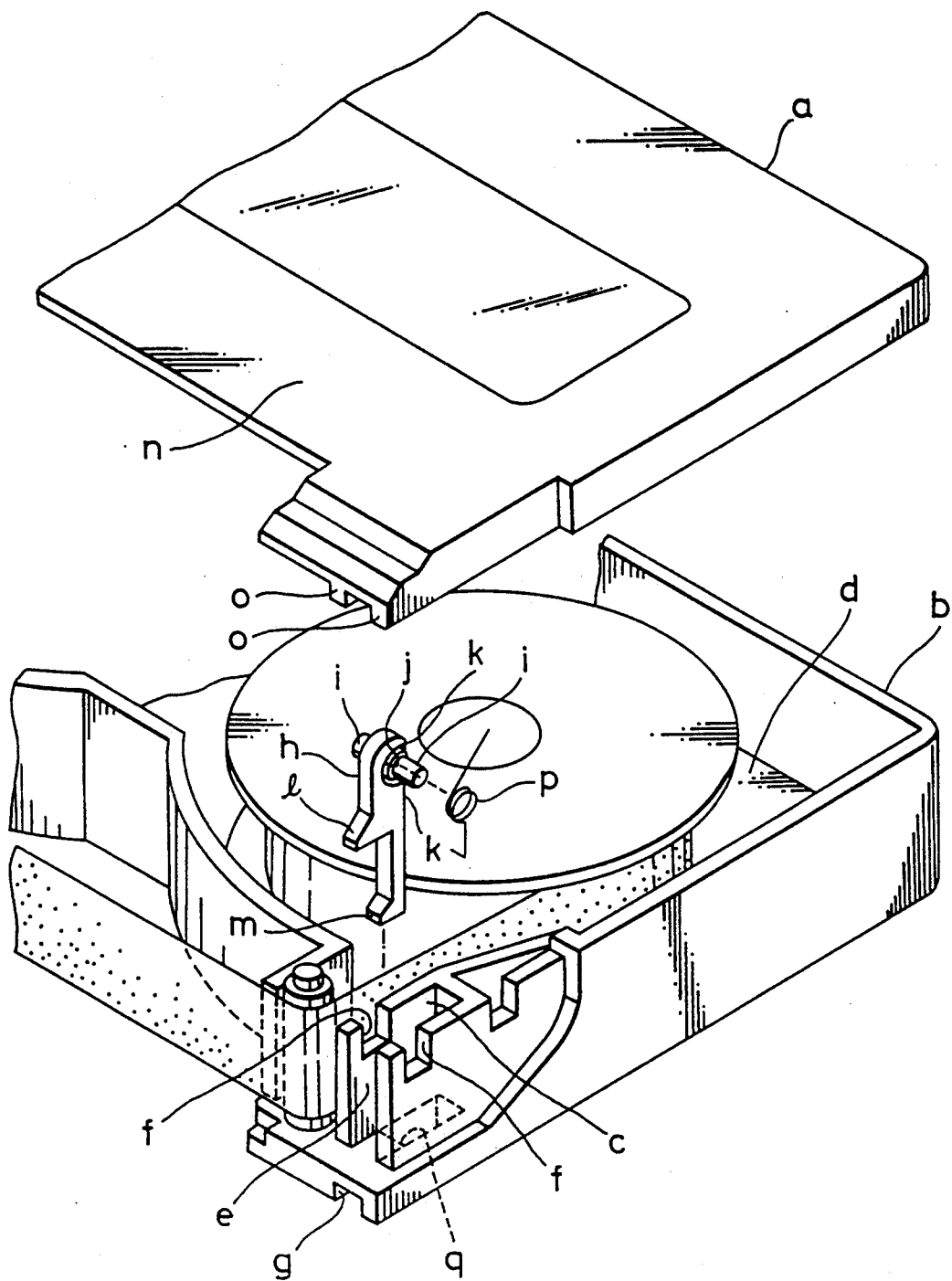
FIG. 1 shows an exploded perspective view of an essential portion of an example of a lid locking mechanism in a conventional tape cassette.
Figure 2:
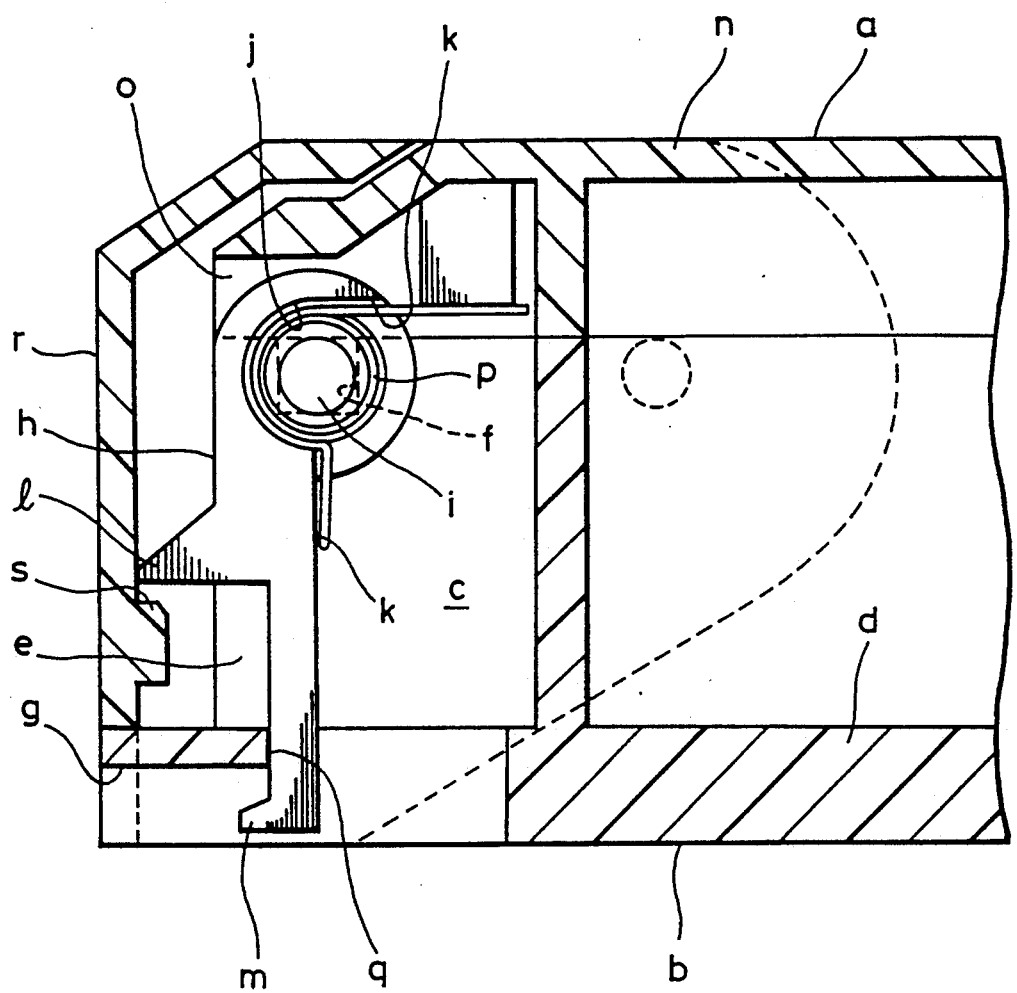
FIG. 2 shows an enlarged cross-sectional view of the essential portion of the lid locking mechanism of the conventional tape cassette in which a lid locking member is in a locking position.
Figure 3:
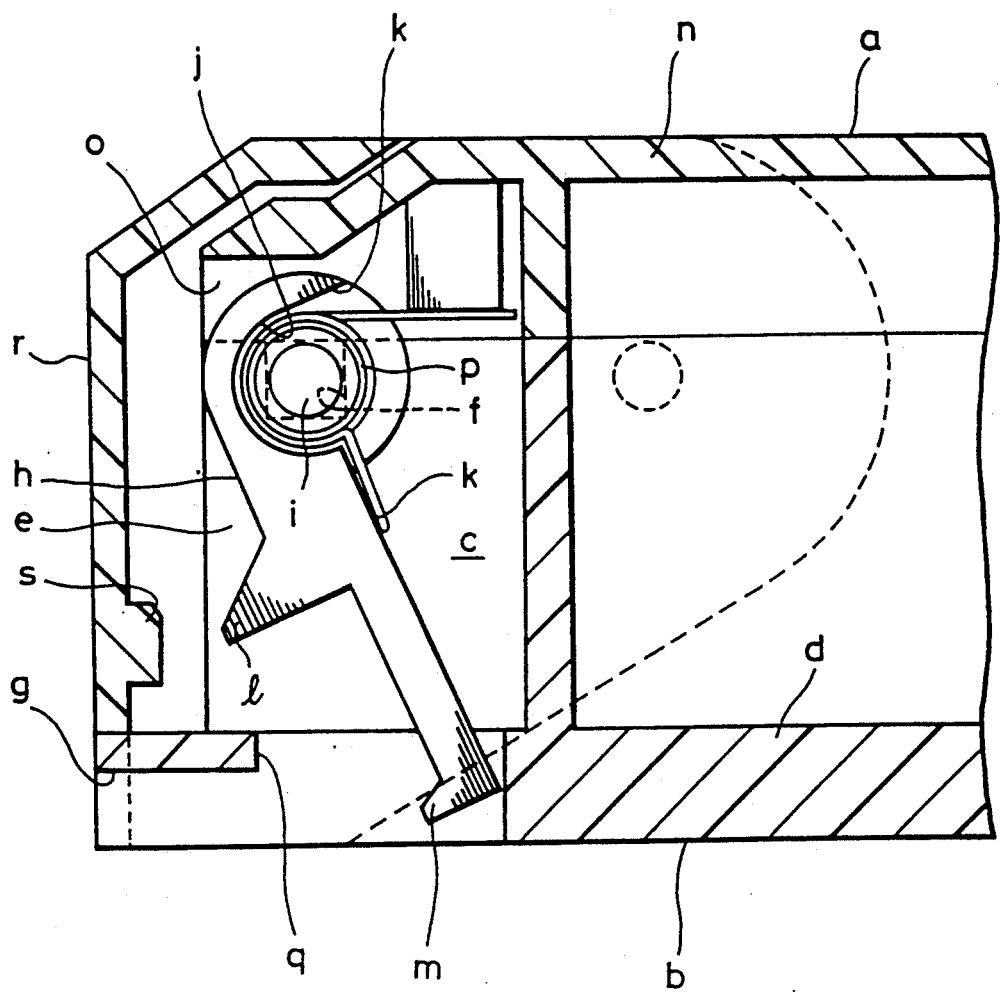
FIG. 3 shows an enlarged cross-sectional view of the essential portion of the lid locking mechanism of the conventional tape cassette in which the lid locking member is shifted to a lock releasing position.
Figure 4:
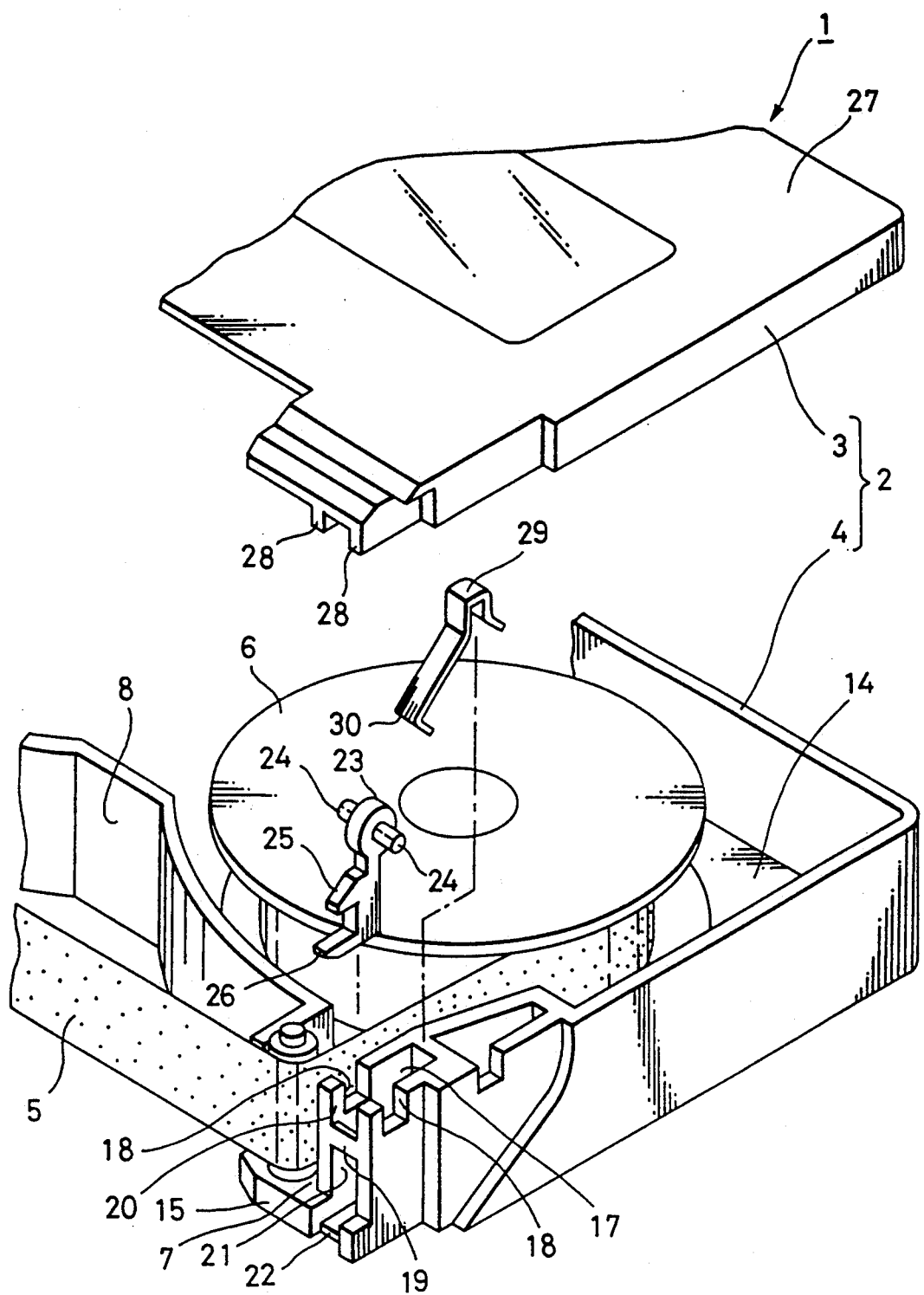
FIG. 4 shows in an enlarge scale an exploded perspective view of an essential portion of a lid locking mechanism for a tape cassette according to an embodiment of the present invention.

Referring to FIG. 4, an upper half 3 and a lower half 4 are combined to form a thin box-shaped cassette casing 2 of an elongated rectangular configuration.

Figure 6:
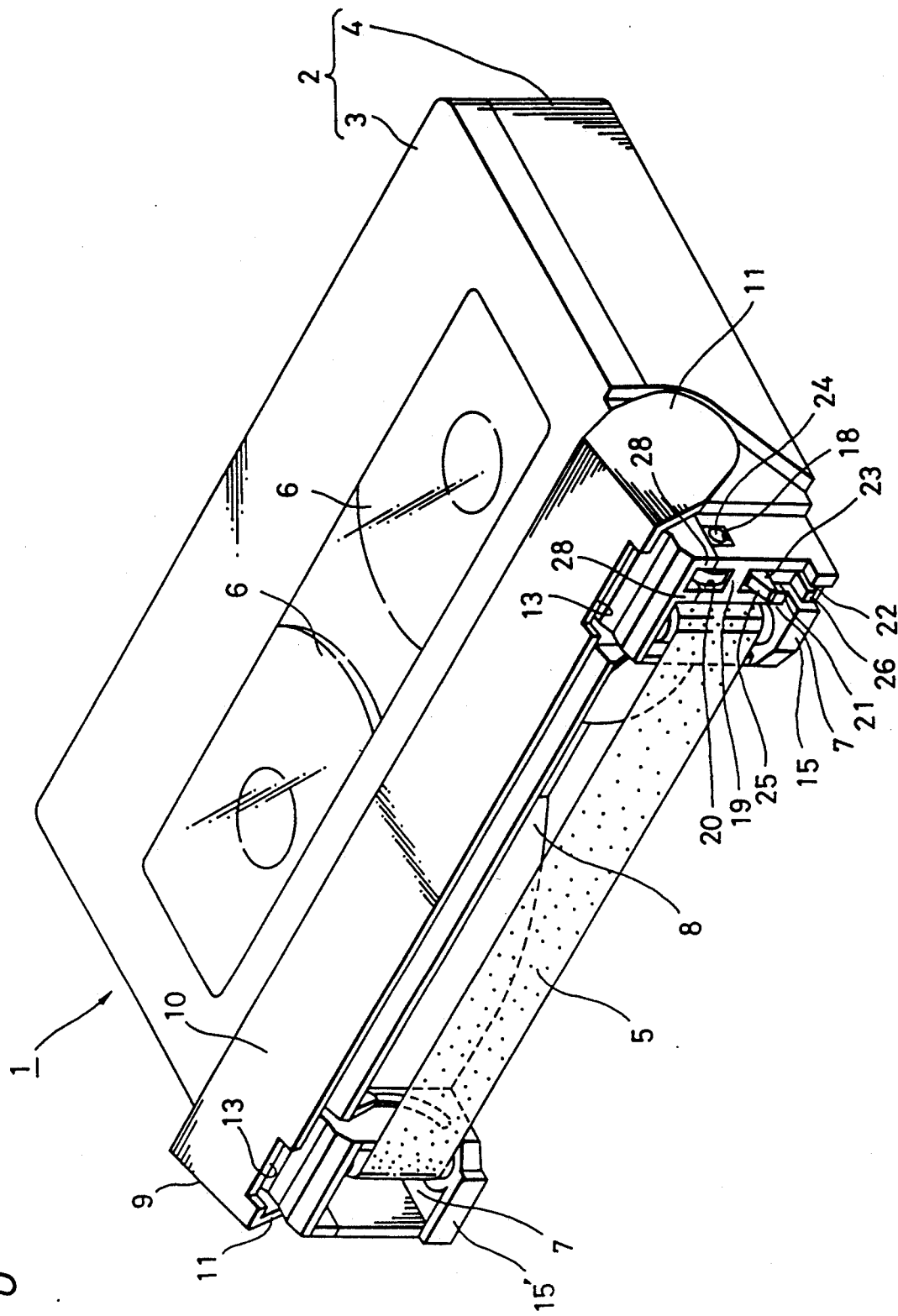
FIG. 6 shows a perspective view of the tape cassette of FIG. 5 in which the front lid is in an open position.

As shown in FIGS. 4 and 6, a magnetic tape 5 is wound around each of tape reels 6, 6 which are rotatably received in the cassette casing 2. A part of the magnetic tape 5 is extended outward along a front wall of the cassette casing 2 between tape outlets 7, 7 formed at both end portions of the front wall. A recess 8 for drawing the magnetic tape 5 is formed on the front wall of the cassette casing 2 between the tape outlets 7, 7 so that the magnetic tape 5 extends in front of the tape drawing recess 8.

Figure 5:
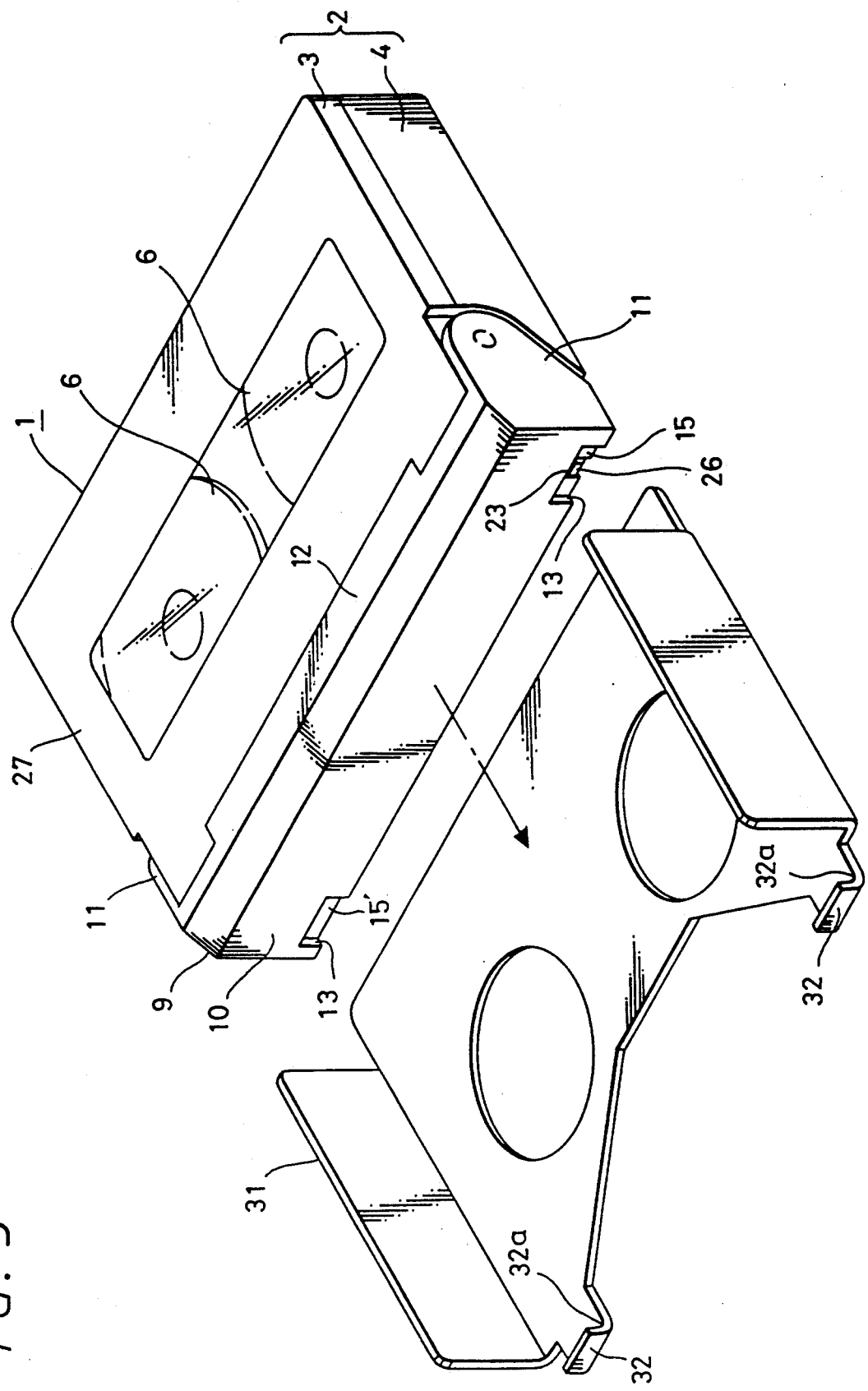
FIG. 5 shows a perspective view of a cassette holding member and a tape cassette, whose front lid is in a closed position, to which the lid locking mechanism according to the present invention is applied.

Referring to FIGS. 5 and 6, a front lid 9 for opening and closing the front wall of the cassette casing 2 is constituted by unitarily forming a front wall 10, two side walls 11, 11, and an upper wall 12. The front wall 10 serves to open and close the front portion of the cassette casing 2, the side walls 11, 11 positioned at both side ends of the front wall 10 extend rearwardly, and the upper wall 12 positioned at the top edge of the front wall 10 extends rearwardly. A portion of each of the side walls 11, 11 closer to the rear end thereof is rotatably supported by a corresponding side panel of the cassette casing 2. Two notches 13, 13 are formed at bottom edge positions of the front wall 10 closer to the side edges thereof from the tape outlets 7, 7, respectively.

Two side end portions 15, 15' on the front edge of a bottom wall 14 of the lower half 4 are disposed outside through the notches 13, 13 of the front lid 9. Each of these portions 15 serves as an abutment for positioning the tape cassette 1 to the direction perpendicular to its longitudinal direction in a manner that an abutment of a cassette holding (retaining) member of the recording-/reproducing apparatus is abutted against the portions 15, 15' when the tape cassette 1 is loaded in the recording and/or reproducing apparatus.

Figure 7:
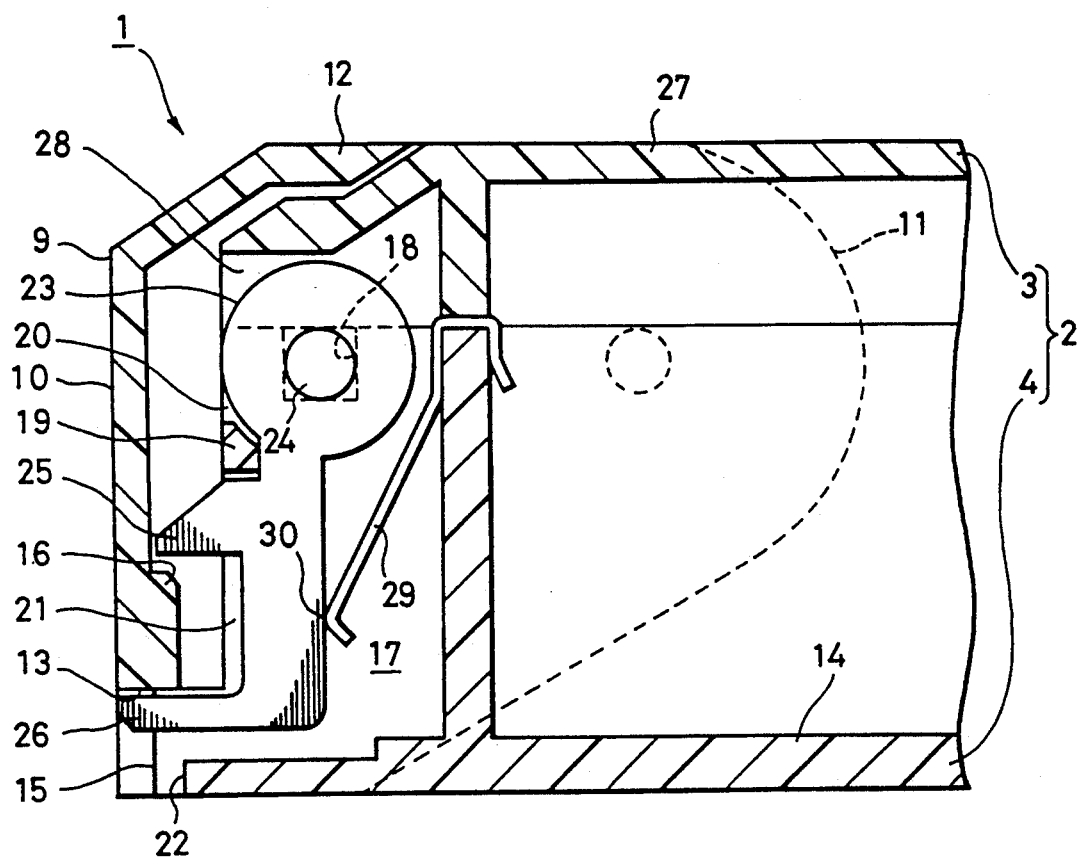
FIG. 7 shows an enlarged cross-sectional view of the essential portion of the lid locking mechanism embodying the present invention in which the lid locking member is in a locking position.

The front lid 9 is rotatable between a closed position wherein the front face of the magnetic tape 5 disposed along the front face of the cassette casing 2 is covered or closed by the front lid 9 (see FIG. 5) and an open position wherein the front lid 9 is rotated upwardly to expose the front face of the magnetic tape 5 (see FIG. 6). As shown in FIG. 7, a portion of the inner surface of the front wall 10 of the front lid 9 positioned slightly above the notch 13 corresponding to the abutment 15 is projected rearwardly to form an engagement portion 16.

An accommodating portion or recess 17 is provided on one of opposite end portions of the front edge of the bottom wall 14 of the lower half 4, that is, a portion on the upper surface of the bottom wall 14 corresponding to the abutment 15. The accommodating portion 17 has an elongated rectangular cylindrical configuration along the side wall of the lower half 4 and its top end is opened. Two recesses 18, 18 are formed at both sides of the top end of the accommodating portion 17.

The front wall of the accommodating portion 17 is opened except for a stopper portion 19 positioned slightly above the center portion of the front wall. Thus, an elongated recess 20 having an opened upper end is formed above the stopper portion 19, and an elongated opening 21 is formed below the stopper portion 19. A shallow escape recess 22 is formed at a portion of the abutment 15 corresponding to the opening 21 of the accommodating portion 17.

A lid locking member 23 of an elongated hook-like configuration is provided at a top end thereof with supporting pins 24, 24 of short post configuration which projects outwardly from the opposite sides of the lid locking member 23.

A portion of the lid locking member 23 positioned on the front face thereof slightly above the center portion thereof projects forwardly to form a projection 25. Further, a portion of the lid locking member 23 positioned at the bottom end of its front face projects forwardly to form a forwardly projecting portion 26.

Thus constituted lid locking member 23 is inserted within the accommodating portion 17 in a manner that the supporting pins 24, 24 are positioned in the recesses 18, 18 of the accommodating portion 17.

At two portions of the lower surface of the top wall or ceiling 27 of the upper half 3 and corresponding to the accommodating portion 17, pressing elements 28, 28 project downwardly from the lower surface thereof parallel and opposite to each other. When the upper and lower halves 3 and 4 are coupled, the lower surfaces of the pressing elements 28, 28 abut the top end surfaces of the two side walls of the accommodating portion 17 respectively, thereby closing the upper openings of the notches 18, 18 which receives the supporting pins 24, 24 of the lid locking member 23, so that the supporting pins 24, 24 are prevented from being dropped out from the notches 18, 18.

A pressing spring 29 is formed by bending a leaf spring material of an elongated strip-like configuration. The top end of the pressing spring 29 is formed to be an inverted U-shaped configuration. A portion of the pressing spring 29 slightly beneath the top end thereof is bent forwardly such that the lower portion is shifted forwardly as the portion thereof become lower, thereby forming a pressing portion 30. The pressing spring 29 is mounted on the accommodating portion 17 in a manner that the top end of the inverted U-shaped configuration of the spring 29 sandwiches the top end of a rear wall of the accommodating portion 17, and the pressing portion 30 presses the rear end surface of the lid locking member 23 forwardly (see FIG. 7). Therefore, the bottom end portion of the lid locking member 23 is resiliently biased to turn forwardly.

Thus, when the lid locking member 23 is not pressed rearwardly at its front face, a portion of the front face thereof just above the projection 25 abuts against the rear face of the stopper portion 19 of the accommodating portion 17, and so the lid locking member 23 is prevented from turning forwardly any more. The position of the lid locking member 23 in this state is called a locked position (see FIG. 7). In this state, the projection 25 projects forwardly from a portion just below the stopper portion 19, and the pressed portion 26 slightly projects from the abutment 15 through the bottom end portion of the opening 21.

As shown in FIG. 7, in the closed position of the front lid 9, the engagement portion 16 thereof is positioned just below the projection 25 of the lid locking member 23 in the locked position. In this state, even if the force is applied to the front lid 9 so as to forcibly turn it towards the open position, the front lid 9 is prevented from turning since the engagement portion 16 engages with the projection 25 of the lid locking member 23. Further, this force for forcibly turning the front lid 9 is transmitted to the stopper portion 19 of the lower half 4 through the engagement portion 16 and the projection 25 of the lid licking member 23. Thus, no force acts on the upper half 3 to separate it from the lower half 4.

This locking state of the front lid 9 by the lid locking member 23 is released by loading the tape cassette into the recording/reproducing apparatus (not shown).

Referring to FIG. 5, the cassette holding member provided in the recording and/or reproducing apparatus, that is, a cassette holder 31 is formed by bending a metal sheet material. The metal sheet material of the cassette holder 31 is bent upwardly at opposite end portions of a front edge thereof to form stoppers 32, 32. When the tape cassette 1 is loaded into the cassette holder 31, the stoppers 32, 32 abut against the abutments 15, 15, of the tape cassette 1, thereby defining an insertion limit of the tape cassette 1 into the cassette holder 31.

Figure 8:
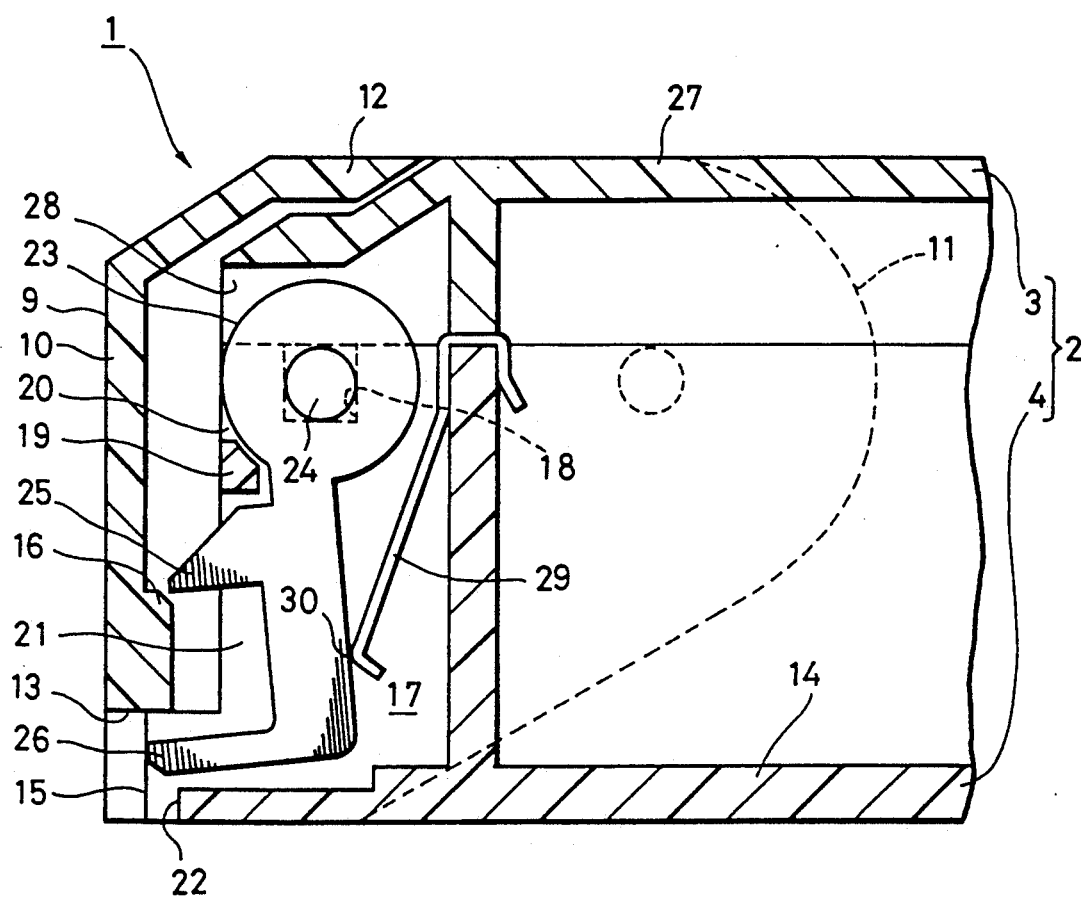
FIG. 8 shows an enlarged cross-sectional view of the essential portion of the lid locking mechanism embodying the present invention in which the lid locking member is shifted to a lock releasing position.

Further, when the stoppers 32, 32 abut against the abutments 15, 15', as shown in FIG. 8, the tip portion of the forwardly projecting portion 26 projecting slightly forwards from the abutment 15 is pressed by the stopper 32. Then, the lower end of the lid locking member 23 is turned to be moved rearwardly, and so the projection 25 thereof leaves rearwardly from a position just above the engagement portion 16 of the front lid 9. Therefore, the locking of the front lid 9 by the lid locking member 23 is released, so that the front lid 9 becomes free to turn towards the open position.

Figure 9:
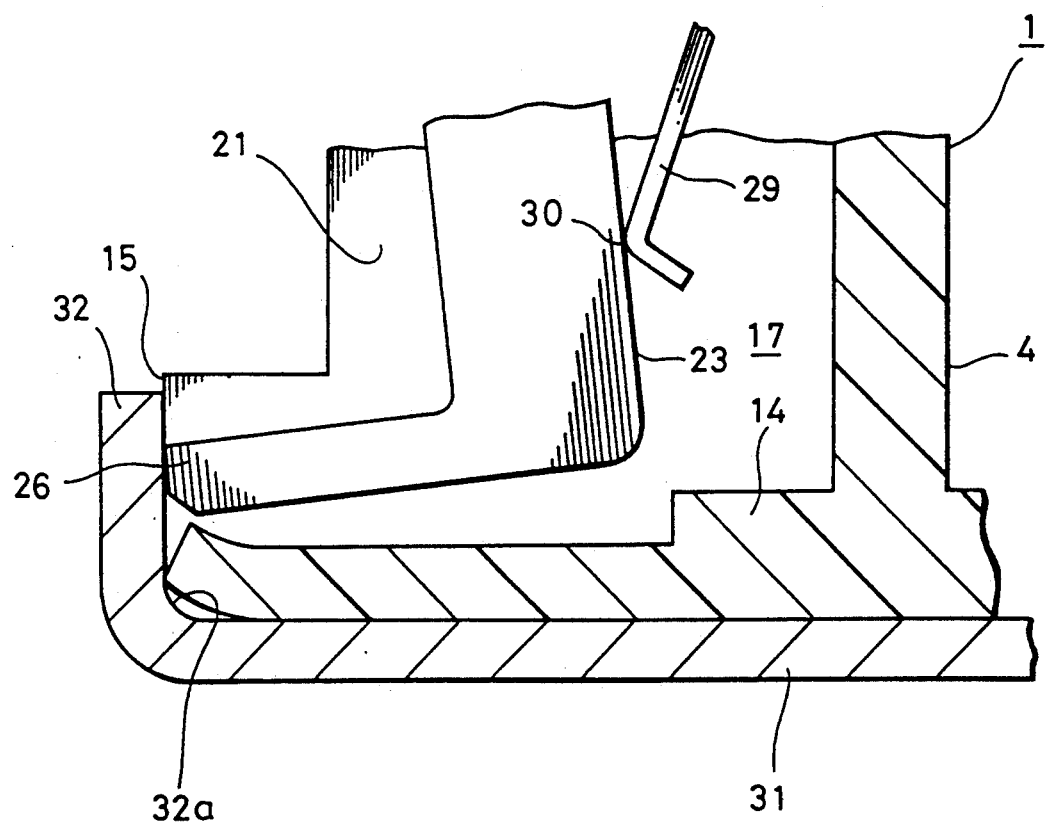
FIG. 9 shows an enlarged cross-sectional view of an essential portion of a comparative tape cassette used for explaining the operation of the present invention.

The stoppers 32, 32 of the cassette holder 31 which is formed by bending the metal sheet material are not bent at right angle on their proximal end portions 32a, 32a but, usually, bent up loosely. When the cassette holder 31 having the thus formed proximal end portions abuts against the abutment 15, upward force is applied to the abutment 15 by the proximal end portion 32a of the stopper 32. Thus, if the upward force is repeatedly applied to the abutment 15, the front end portion thereof may be deformed upwardly, that is, lifted, as shown in FIG. 9. If the abutment 15 is deformed in this manner, the lid locking member 23 can not turn to the locked position since the bottom end of the lid locking member 23 close to the upper face of the bottom wall 14 of the lower half 4, in particularly, the bottom end portion of the front edge of the forwardly projecting portion 26 is engaged with the front edge of the abutment 15 which is deformed upwardly. Thus, the front lid 9 cannot be locked completely.

In order to obviate this problem, one method is proposed in which a distance of the forwardly projecting portion 26 of the lid locking member 23 from the upper surface of the bottom wall 14 is made larger. In this case, the height of the stopper 32 is also required to be higher since the height of the forwardly projecting portion 26 becomes higher. Then, the height of the notch 13 of the front lid 9 for passing the stopper 32 therethrough is also required to be higher. However, the height of the notch 13 is limited in view of the height of the magnetic tape 5, so that this method is improper.

However, in this embodiment, the shallow escape recess 22 is formed at a portion of the abutment 15 corresponding to the opening 21 of the accommodating portion 17 as shown in FIG. 7. In this case, the front end portion of the abutment 15 can not be deformed even when it abuts against the stopper 32, so that the above-described problem can be eliminated.

As set out above, according to the present invention, in a tape cassette wherein tape reels for winding a tape-shaped recording medium are rotatably accommodated in a box-shaped cassette casing which is formed by combining two cassette halves or upper and lower parts, the recording medium is extended outward along the front wall of the cassette casing between tape outlets formed at both end portions of a front wall of the cassette casing, and the lid for opening and closing the front surface of the recording medium which extends along the front wall of the cassette casing is supported at the front portion of the cassette casing so as to be rotatable upward and downward, the lid locking mechanism includes: an engagement formed on the inner surface of the lid; the lid locking member having the projection and rotatably supported at its upper end between the halves, the lid locking member being resiliently biased in a manner that its lower end turns forwardly so that the projection engages with the engagement formed on the inner surface of the lid; and the stopper formed on one of the halves, the stopper abutting against or closing to the upper surface of the projection in the locked state where the projection engages with the engagement.

According to the thus constituted lid locking mechanism for a tape cassette, since the force applied to the front lid for forcibly turning it towards the open position is transmitted to the stopper portion of the lower half through the engagement portion and the projection of the lid locking member, no force acts on the upper half to separate it from the lower half. Thus, it can be prevented that the abutment between the lower and upper halves is opened and that the lower and upper halves are damaged.

Further, according to the present invention, the lid locking member further includes: a forwardly projecting portion formed at a bottom portion of the lid locking member such that it projects from an abutment formed at the front end of the cassette casing in the locked state; a stopper provided at a cassette holding member of a recording and/or reproducing apparatus; and a recess formed at a portion of the projection corresponding to the forwardly projecting portion of the lid locking member, wherein when the tape cassette is loaded in the recording and/or reproducing apparatus, the stopper abuts against the abutment and presses the forwardly projecting portion to turn the lid locking member rearwardly against the resiliently biasing force to thereby release the engagement between the projection of the lid locking member and the engagement portion of the lid.

Thus, since the abutment is prevented from being deformed owing to the abutting against the stopper, the lid locking member can be turned surely to the locked position even if the forwardly projecting portion of the lid locking member is arranged close to the abutment.

Having described the preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

What is claimed is:

1. A lid locking mechanism for a tape cassette wherein tape reels for winding a tape-shaped recording medium are rotatably accommodated n a box-shaped cassette casing formed by combining upper and lower cassette halves, the recording medium extending outward along a front wall of the cassette casing between tape outlets formed at both end portions of the front wall of the cassette casing, and a lid for opening and closing a front surface of the recording medium which extends along the front wall of the cassette casing, the lid being rotatably supported at a front portion of the cassette casing so as to be rotatable upward and downward, said mechanism comprising:

an engagement formed on an inner surface of the id for releasably locking the lid in a closed position;

a lid locking member having a projection and rotatably supported at its upper end between the cassette halves, the lid locking member having a resilient bias force exerted thereon in a manner that its lower end turns forwardly so that the projection is adjacent to the engagement formed on the inner surface of the lid to lock the lid;

a stopper formed on one of the cassette halves, the stopper being adjacent to an upper surface of the projection when the lid is closed and the projection is adjacent to the engagement;

a forwardly projecting portion formed at a bottom portion of the lid locking member such that is projects from an abutment formed at a front end of the cassette casing when the lid is closed; and a recess formed at a portion of the abutment in the vicinity of the forwardly projecting portion, wherein when the tape cassette is loaded in a recording and/or reproducing apparatus having a cassette holder stopper, the cassette holder stopper abuts against the abutment and presses the forwardly projecting portion to turn the lid locking member rearwardly against the resilient bias force to thereby allow said lid to open.

2. A lid locking mechanism for a tape cassette wherein tape reels for winding a tape-shaped recording medium are rotatably accommodated in a box-shaped cassette casing formed by combining upper and lower cassette halves, the recording medium extending outward along a front wall of the cassette casing between tape outlets formed at both end portions of the front wall of the cassette casing, and a lid for opening and closing a front surface of the recording medium which extends along the front wall of the cassette casing, the lid being rotatably supported at a front portion of the cassette casing so as to be rotatable upward and downward, comprising:

an engagement formed on an inner surface of the lid for releasably locking the lid in a closed position;

a lid locking member having a projection and rotatably supported at its upper end between the cassette halves, the lid locking member having a resilient bias force exerted thereon in a manner that its lower end turns forwardly so that the projection is adjacent to the engagement formed on the inner surface of the lid to lock the lid;

a stopper formed on the lower cassette half, the stopper being adjacent to an upper surface of the projection when the lid is closed and the projection is adjacent to the engagement;

a forwardly projecting portion formed at a bottom portion of said lid locking member such that it projects from an abutment formed at a front end of the cassette casing when the lid is closed; and a recess formed at a portion of the abutment in the vicinity corresponding to said forwardly projecting portion, wherein when the tape cassette is loaded in a recording and/or reproducing apparatus having a cassette holder stopper, the cassette holder stopper abuts against the abutment and presses the forwardly projecting portion to turn said lid locking member rearwardly against the resilient bias force to thereby allow said lid to open.

* * * * *